US005956039A

United States Patent [19]
Woods et al.

[11] Patent Number: 5,956,039
[45] Date of Patent: Sep. 21, 1999

[54] SYSTEM AND METHOD FOR INCREASING PERFORMANCE BY EFFICIENT USE OF LIMITED RESOURCES VIA INCREMENTAL FETCHING, LOADING AND UNLOADING OF DATA ASSETS OF THREE-DIMENSIONAL WORLDS BASED ON TRANSIENT ASSET PRIORITIES

[75] Inventors: Daniel J. Woods, Sunnyvale; Christopher F. Marrin, Fremont; Glenn C. Shute, Sunnyvale; David C. Mott, Mountain View, all of Calif.

[73] Assignee: PLATINUM technology IP, Inc., Oakbrook Terrace, Ill.

[21] Appl. No.: 08/900,471

[22] Filed: Jul. 25, 1997

[51] Int. Cl.[6] ........................................................ G06F 15/00
[52] U.S. Cl. .................................. 345/419; 345/421
[58] Field of Search ................................. 345/419, 421

[56] References Cited

PUBLICATIONS

Jean–Francis Balaguer and Enrico Gobbetti, Center for Advanced Studies, Research and Development in Sardinia, *i3d:A High–Speed 3D Web Browser* (1995), 15 pages.

Thomas A. Funkhouser and Carlo H. Séquin, "Adaptive Display Algorithm for Interactive Frame Rates During Visualization of Complex Virtual Environments," *Computer Graphics Proceedings, Annual Conference Series, 1993*, pp. 247–254.

James Kent, Silicon Graphics, Inc., *VRML and WebSpace 3D Navigation Interfaces for the World Wide Web*, date unknown.

John Rohlf and James Helman, "IRIS Performer: A High Performance Multiprocessing Toolkit for Real–Time 3D Graphics," *Computer Graphics Proceedings, Annual Conference Series, 1994*, pp. 381–394.

*Primary Examiner*—Mark K. Zimmerman
*Assistant Examiner*—Motilewa Good-Johnson
*Attorney, Agent, or Firm*—Fish & Richardson P.C.

[57] ABSTRACT

A system and method for increasing the performance associated with creating simulated 3D worlds from a network. The system and method provides a means for increasing the performance by fetching objects in the order of their importance. A priority scheme is used to determine the fetching, pre-fetching, and caching of URLs. The operations of assigning priorities, making prefetch requests and cache management is driven by data in an asset database table. The database contains information pertaining to each asset within the current scene such as the priority, status, region, type bounds, and retrieval time. The asset database table is updated based on fetching activities, camera position, and the positions of moving assets. A world scene is subdivided into appropriately sized regions when a scene is first downloaded. Asset type origins are defined and moved, based on the position, orientation, and velocity of the camera. Regions are assigned priorities based on their distance from the asset origin. Assets within particular regions are assigned priorities based on the region priorities and the asset type.

33 Claims, 8 Drawing Sheets

```
#VRML V2.0                                          ─202
Group { children [                                  ─204
    Inline {                                        ─206
                    url "earth.wrl"                 ─208
        bboxSize    2 2 2                           ─210
        bboxCenter  0 0 0                           ─212
    },                                              ─214
    Anchor {                                        ─216
        url "http://www.globe.com"                  ─218
        description "Globe home page"               ─220
        children [                                  ─222
            Transform {                             ─224
            translation 0 1.25 0                    ─226
            scale 0.025 0.025 0.025                 ─228
            children [                              ─230
                Shape {                             ─232
                appearance Appearance {             ─234
                    material Material {             ─236
                        diffuseColor  1 0 0         ─238
                    }                               ─240
                }                                   ─242
                geometry                            ─244
                    Text {                          ─246
                        fontStyle Fontstyle {       ─248
                            size 10                 ─250
                            justify "MIDDLE"        ─252
                        }                           ─254
                        string "Click to explore"   ─256
                }                                   ─258
            }                                       ─260
            ]                                       ─262
        }                                           ─264
        ]                                           ─266
    }                                               ─268
    ]                                               ─270
}                                                   ─272
```

*FIG. 2*

SYSTEM AND METHOD FOR INCREASING PERFORMANCE BY EFFICIENT USE OF LIMITED RESOURCES VIA INCREMENTAL FETCHING, LOADING AND UNLOADING OF DATA ASSETS OF THREE-DIMENSIONAL WORLDS BASED ON TRANSIENT ASSET PRIORITIES

BACKGROUND OF THE INVENTION

1. Field of the Invention

The present invention relates generally to 3D modeling systems and more specifically to an intelligent system and method for increasing performance by the efficient use of limited resources via incremental fetching, loading and unloading of data assets of three-dimensional worlds based on transient asset priorities.

2. Related Art

In just a few short years since its emergence on the Internet, the world wide web (WWW) has revolutionized the way many people communicate with each other and interact with commercial, governmental and educational entities. Before the emergence of the world wide web, the Internet was predominantly used by governmental, scientific and academic communities. Since the introduction of the world wide web however, the Internet has experienced unprecedented growth and has become a cultural phenomenon that is used on a regular basis by mainstream populations throughout the world.

The Internet has been transformed from a cryptic command line, text-based environment into a user-friendly, easily navigable 'cyber space' filled with colorful graphical images, high quality sounds and full motion video. Anyone can navigate through the world wide web by simply pointing and clicking with a mouse or other pointing device, such as a trackball, touchpad, touch screen or electronic pen. This transformation has lead to an abundance of new Internet subscribers and Internet providers.

The transformation of the Internet has been accomplished for the most part through the use of a standard markup language used by Internet sites known as the hypertext markup language (HTML). HTML provides a unified interface to text and multimedia data. HTML provides a means for anyone with a text editor to create colorful 'web pages' which can be viewed by Internet subscribers around the world. HTML sites are viewed through the use of a tool known as a browser which enables one to explore the contents of databases located throughout the world without needing to be concerned about the details of the data format. Browsers download and interpret the HTML provided by each Web site and display them as 'pages' on a local display device, such as a computer monitor or the like. Each HTML page can contain text, graphics and hypertext links to other HTML pages. Each page has a unique Internet address which is referred to as a Uniform Resource Locator (URL).

Thus, when a user clicks on a hypertext link a new URL is fetched by the browser and downloaded to the user's workstation. Typically, the previous web page is replaced by a new web page that is defined by the HTML provided by the new URL. Generally hypertext links are depicted as underlined or highlighted words, depending on the browser's implementation of displaying of HTML. Hypertext links can also appear as buttons or other graphical images. In addition, in most browsers, the shape of the cursor changes when the pointer passes over a hypertext linked screen object. For example, a cursor having the shape of an arrow may change into the shape of a hand when passing over a hypertext link.

Each HTML page can have an arbitrary length. For example, consider a WWW site that provides a selection of Shakespeare's plays. The first page of the website may comprise a list of all available plays. Each element in the list comprises a URL link to one of Shakespeare's plays. The list may be scrolled vertically or horizontally by the user, depending on the implementation of the HTML as provided by the web page author. When a user selects a play by clicking the mouse button on a list item, a new HTML page is downloaded from the URL and the list is replaced with a representation of the selected play.

The selected play may be represented in a variety of ways by the web page author. For example, the entire play can be represented by a single URL as one long scrollable web page. Alternatively, each page of the play can be represented by a different URL, in which case a different set of HTML links will be included at the bottom of each page providing a link to the next or previous pages, for example. In other implementations, a web page author may choose to represent each scene or act in the play as a single URL or web page.

Each time a new web page is loaded, a new HTML document must be downloaded or fetched by the browser. The amount of time it takes to fetch each new web page depends on the size of the new web page and the complexity of the content contained therein.

A new description language which promises to further revolutionize the WWW has recently appeared on the Internet. This new language is called virtual reality modeling language (VRML). VRML documents are used to create three dimensional (3D) infinitely scalable, virtual worlds on the Web. The goal of these worlds is to provide a convincing illusion of a 3D environment that visitors may explore. Similar to the way HTML operates, VRML documents are downloaded from VRML web sites into local host computer systems by VRML browsers. The VRML browsers interpret the scene (also referred to herein as a 'world' or 'model') that is described by the VRML file and renders the resulting images on the local display device. 3D rendering is performed from the viewpoint of a virtual camera that has the ability to move and tilt in any direction in response to user input, via a mouse, keyboard or other input device. In addition, objects within the 3D world can be examined and manipulated by a user. Further, like HTML, VRML documents can provide links to other VRML worlds and/or HTML Web pages through the use of URL links.

The use of VRML enables Internet users to navigate through three dimensional worlds in real-time. 3D environments are being used to augment the information gathering experience of Internet users. For example, a user can navigate through the streets of a city and hyper link to a particular company's home web page by clicking on the company's building site. Other examples include on-line virtual shopping, museum browsing, entertainment and corporate briefing centers. VRML also allows users to experience worlds that have no physical counterpart and are not constrained by physical restrictions due to size, location, time, or safety. Such worlds need not even obey the laws of physics that govern our everyday lives.

Although the use of VRML represents a major breakthrough on several levels, many problems are still to be overcome. Many of the problems that are encountered are related to the requirement of real-time performance. Fetching and rendering 3D data is very time consuming due to the volume of data that needs to be downloaded into the local computer system, and the computational power required to render the 3D images. Thus, performance problems are primarily due to two limiting factors, namely the bandwidth of the Internet connection and the limited resources and processing power of the local computer system.

For example, limited resources of the local computer system include general purpose random access memory, video card memory, sound card memory and disk caches. The network itself can also be considered a limited resource. Each limited resource has a particular access time associated with it. The access time is the amount of time it takes to retrieve the data from the limited resource and send it to the appropriate place to be presented to the user.

In general, access times for sound and video card memory are very low. This is followed by general purpose memory, which is followed by disk cache memory. Typically the network itself is the source of the greatest access time.

Today, most Internet connections are accomplished via analog telephone lines using commercial-off-the-shelf modems. Such modems typically operate at speeds of up to 28,000 bits per second. This limited bandwidth makes it difficult to download the vast amount of information needed to render 3D worlds in a real-time fashion. Even the fastest Internet connections, such as those implemented using ISDN lines, which provide Internet connection speeds of up to 144,000 bits per second, are generally not fast enough to alleviate the bottleneck problems due to limited bandwidth.

Using conventional methods, a clever VRML author may attempt to organize the VRML document so that certain objects that are considered more important are downloaded before other objects. Conventionally, URLs within VRML documents are processed in the order in which they are written. That is, URLs that are located at the top of the VRML file are downloaded before URLs that are located at the bottom.

Thus, a VRML author may attempt to increase the performance of the 3D world by optimally arranging the order of URLs contained in the VRML file. However, due to the nature of 3D worlds, this task is almost impossible. Problems arise because it is very difficult to predict the way users will interact with the 3D world. Users are free to move in any direction, change viewing angles and movement speeds. Further, users are free to click on close or distant objects in an arbitrary fashion. Thus, because so many variables are possible, the conventional method does not provide a means to optimally pre-order the URLs to affect the fetching to increase the performance of the 3D world.

SUMMARY OF THE INVENTION

Accordingly, the present invention is directed toward a system and method for increasing performance by the efficient use of limited resources via incremental fetching, loading and unloading of data assets of three-dimensional worlds based on transient asset priorities. The present invention increases the performance by fetching objects in the order of their importance. A priority scheme is used to determine the fetching, pre-fetching, and caching of data assets. The operations of assigning priorities, making prefetch requests and cache management are driven by data in an asset table. Preferably the asset table is implemented with a database. The database contains information pertaining to each asset within the current scene such as the priority, status, region, type bounds, and retrieval time. Asset types include sound, inlines, movies, images, anchors, behavior, background, images and scripts.

The asset table is updated based on fetching activities, camera position, and the positions of moving assets. A current scene is subdivided into appropriately sized regions when a scene is downloaded by an implementation of the present invention. An asset origin is defined for each asset type. An asset is assigned a priority based the region priorities and the value of an asset type offset. The asset table is updated based on changes to the camera's position. In addition, preferably, the asset table is updated when a fetch request is complete, or an asset leaves or enters a region.

Information contained in the asset table is used to assign and update fetching priorities. In addition to the position of assets, asset bounds are considered when determining priority. For example, if a sound has a range that extends into every region in the world, then the sound asset will likely have a high priority.

One advantage of the present invention is that it provides increased performance associated with creating 3D worlds from a network by fetching objects that are most important to the user as quickly as possible.

Another advantage of the present invention is that the unloading of low priority assets enables the browsing of an infinitely large world by effective use of finite resources.

BRIEF DESCRIPTION OF THE FIGURES

The present invention will be described with reference to the accompanying drawings, wherein:

FIG. 2 is a block diagram of a VRML file that can be used with an implementation of the present invention;

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

The present invention is directed towards a system and method increasing the performance associated with creating simulated 3D worlds from a network, such as the Internet. The present invention provides at least two major enhancements to conventional fetching methods. First, the present invention determines a priority for data, so that the most important data is fetched first (i.e. that data which is most likely perceived). Second, the present invention provides the ability to unload data from memory or other cache storage levels, when such data is not longer perceivable.

In order to fully describe the features of the present invention, a discussion of the standardized VRML language is presented below. For the purposes of this disclosure, a discussion of VRML 1.0 is presented. However, it should be apparent to those skilled in the relevant arts, that the principles of the present invention can be applied to all current and future versions of VRML and other graphic modeling languages. As such, the examples used herein should not be construed to limit the scope and breadth of the present invention.

VRML is based on Silicon Graphics' Open Inventor ASCII file format and provides a means for describing 3D worlds using plain text. Typically however, VRML worlds are created with graphical content creation tools, which isolates VRML authors from having to learn the syntax and format of the VRML language. However, in order to better understand the optimization techniques provided by the present invention, a brief discussion of VRML in terms of its syntax, and the interaction between the server and client is presented below.

As used in this example, the term server refers to the host computer system that provides 3D world descriptions in the form of VRML data files. The term client refers to a user's local computer system that is running a web browser which downloads and interprets the VRML data files from the host computer system over a computer network, such as the Internet. As stated, other modeling languages can be used with the present invention and VRML is used herein only for exemplary purposes. The 3D worlds are rendered by the client on a local display device. An example of a web server and client is depicted in FIG. 1.

Figure 1:
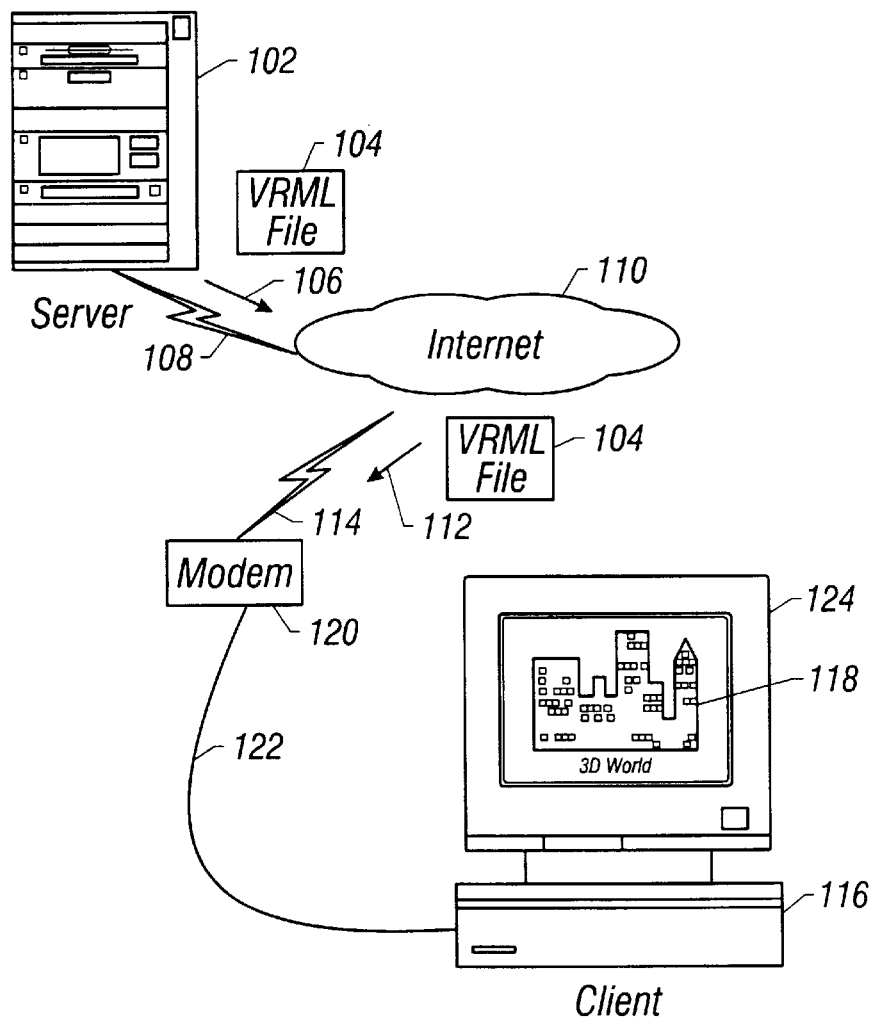
FIG. 1 is a block diagram depicting an operational environment according to a preferred embodiment of the present invention.

FIG. 1 depicts an Internet web server and client in a typical environment according to an embodiment of the present invention. The server 102 is connected to a network, such as the Internet 110, via the transmission line 108, such as a T1 transmission link, or other communication medium. In this example, the client 116 is connected to the Internet 110 via a standard telephone line 114, which is coupled with a modem 120. The modem 120 is coupled with the client computer system via the serial cable 122. Typically, the data transfer capacity of the client is lower than the data transfer capacity of the server. For example, a typical Internet connection is accomplished with the use of a modem that transfers data at a rate of 28,800 bits per second.

Descriptions of 3D worlds are provided by the server 102 via VRML data files, such as the data file 104. The VRML data file 104 is fetched, or downloaded from the server 102 to the client 116, as depicted by the arrows 106 and 112 respectively. The client 116 then interprets the VRML data file using a browser program which renders the 3D world 118 on the video screen 124 of the client computer system 116. The VRML data file 104 may, in turn, refer to additional data stored on the server 102, or any other device (not shown) coupled to the network 110.

VRML models are defined as a collection of nodes that are arranged in a hierarchical tree structure called a scene graph. Attributes of the model, such as geometry and color are described by property nodes. For example, the Sphere node denotes a spherical object, and the Transform node can cause objects that appear after it to be translated, rotated, and/or scaled by a specific amount. Detailed descriptions of the VRML 1.0 specification and the concepts upon which it is based can be found in the following publications: M. Pesce, G. Bell, and A. Parisi, *VRML 1.0 specification*, http://vrml.wired.com/vrml.tech/vrml103.html, 1995; M. Pesce, *VRML Browsing and Building Cyberspace*, New Riders Publishing, Indianapolis, 1995; and J. Wernecke, *The Inventor Mentor*, Addison-Wesley, Reading, Mass. 1994. Detailed descriptions of the VRML 2.0 specification can be found in Carey, Rikk, Chris Marrin and Gavin Bell, *The Virtual Reality Modeling Language Specification: Version 2.0*, ISO/IEC CD 14472, Aug. 4, 1996, also available as http://vrml.sgi.com/moving-worlds/spec/index.html.

Nodes may inherit properties from other nodes that appear above them in the scene graph. Such ordering is important because nodes defined earlier in a scene can affect nodes that appear later in the scene. For example, a Transform or Material node can affect the nodes that appear after it.

VRML uses a Cartesian, right-handed, 3-dimensional coordinate system. By default, objects are projected onto a 2-dimensional device by projecting them in the direction of the positive Z axis, with the positive X axis to the right and the positive Y axis up. A camera or modeling transformation may be used to alter this default projection. The standard unit for lengths and distances specified is meters and the standard unit for angles is radians. By default, the camera, which determines the viewpoint of the user, is located at (0,0,10) and looks along the negative z-axis.

The present invention provides optimization techniques for fetching and caching assets. Such assets may be defined for example, in an Inline node. Inline nodes typically contain references to other scene graphs that are referred to as the children of the Inline node. An Inline node can read its children from anywhere in the world wide web. Further, the children of a Inline node often contain additional children.

A node called a level of detail (LOD) node also uses the child-parent hierarchy. This group node is used to allow applications to switch between various representations of objects automatically. The children of LOD nodes typically represent the same object or objects at varying levels of detail, from highest detail to lowest. Thus, when the camera is far away from an object, there is no need to render the object with the highest level of detail. However as the observer moves closer to the object, the next level of detail is rendered to represent the object. The VRML author specifies, in a ranges array, the distances from the object which corresponds to each particular level of detail.

The Anchor group node loads a new scene into a VRML browser when one of its children is selected by the user. The method used to select a child of an Anchor depends on the implementation of the VRML browser. However, this is typically accomplished by clicking on one of its children with the mouse. This will result in the new scene replacing the current scene.

Various types of Texture nodes are provided by VRML. Each of these property nodes defines a texture map and parameters for that map. This map is used to apply texture to geometric shapes after they are rendered. A Pixel Texture node contains the texture data within its definition and the other texture nodes refer to URLs form which textures can be obtained.

Figure 3:
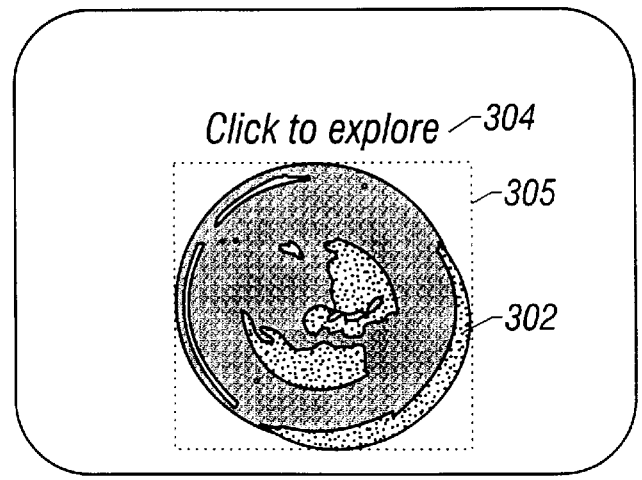
FIG. 3 is a diagram depicting the rendering of the VRML of FIG. 2 as would be displayed on a computer terminal.

An example of a scene graph that depicts some of the concepts described above is shown in FIG. 2. In this example, a VRML 2.0 file is depicted that defines a 3D model of the earth with the words "Click to explore" above it. FIG. 3 shows an example of how this 3D model may look when rendered on a local display device, such as the display device 116.

Referring to FIG. 2, the first line 202 identifies this file as a VRML 2.0 data file. Line 206 is the beginning of a Inline node that ends with the curly brace in line 214. The Lines 210 and 212 define a boxed shape boundary that defines the bounding box within the current world in which the child scene graph is confined. This boundary is depicted by the dotted line 305 shown in FIG. 3. Note that the dotted line 305 is not visible, but forms the boundary for the objects defined by the child scene graph. Line 208 contains a URL which is identifies the child scene graph as "earth.wrl". Thus, the file "earth.wrl" is another VRML file (not shown)

that describes and models the picture of the earth 302, as shown in FIG. 3.

The remaining lines of the VRML file 102, serve to complete the world scene as shown in FIG. 3. For example, line 216 contains an Anchor node. Anchor nodes are used to create links between objects in the scene and other world wide web content. Such other content can be other VRML scenes, HTML web pages etc. In this example, the words "Click to explore" are linked to the 'globes' HTML web page. Thus, clicking on any of the letters in the text will cause this page to be fetched and displayed in an HTML browser window.

Figure 4:
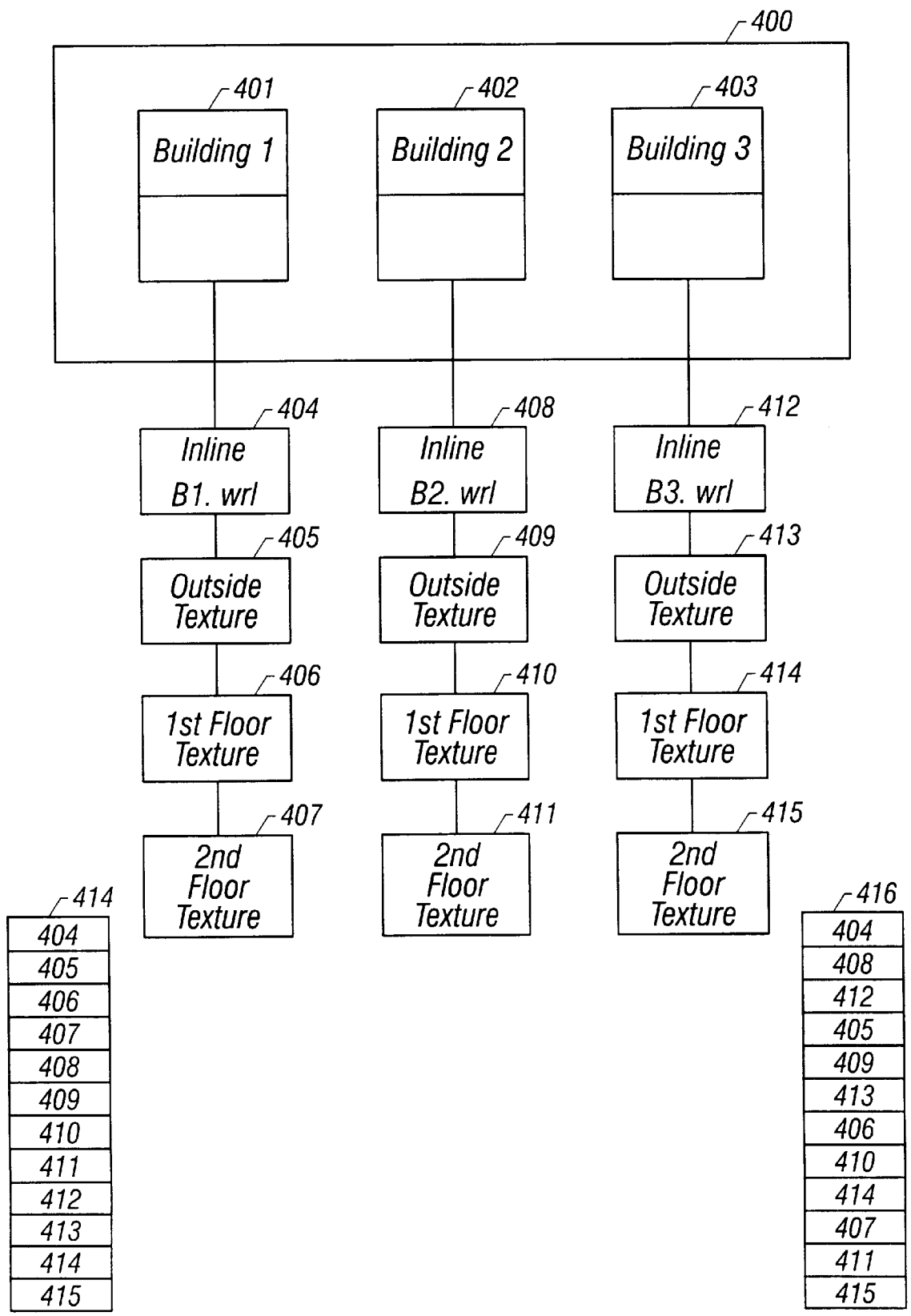
FIG. 4 is a block diagram useful for describing the prioritizing principles according to the present invention.

FIG. 4 is a block diagram useful for describing the prioritizing principles according to the present invention. In this example, assume that a simple 3D world consists of 3 two-story buildings 401, 402, and 403. Each of the 3 buildings are modeled using four assets located in four separate files, each identified by unique URLs. For example, building 1 is modeled using an Inline asset 404 representing the building's geometry, and three texture assets. The texture assets 405, 406 and 407 represent the outside, first floor and second floor textures, respectively. The other two buildings 402 and 404 are modeled in a similar fashion. That is, building 2 is modeled using an Inline asset 408 and three texture assets 409, 410 and 411. Similarly, building 3 is modeled using an Inline asset 412 and three texture assets 413, 414 and 415.

Using traditional methods, assets in the VRML file 400 are fetched in the order in which they are encountered. In this example, it is assumed that the VRML file 400 is organized such that a description for building 1 is followed by a description for building 2, which is followed by a description for building 3. Thus, using traditional methods, URLs are fetched in the order shown in table 414. That is, the URLs are fetched in the following order: 404, 405, 406, 407, 408, 409, 410, 411, 412, 413, 414, and 415.

Hence, using traditional methods, all of the assets that represent building 1 are fetched before the assets representing buildings 2 or 3. Generally this will cause building 1 to be displayed before buildings 2 and 3. Further, valuable time is spent fetching images which are not immediately rendered because they are not visible to the user. In this example, the textures within the interior space of building 1, such as the first and second floor textures 406 and 407, are not visible while the camera is located outside of the buildings. Thus, fetching such textures before they are needed is wasteful and causes a decreased perception of performance.

Accordingly, using the example above, it would be preferable to fetch the outside geometries 404, 408 and 412 of the buildings 1, 2 and 3, before fetching any of the texture assets. This is because, a user will be able to interact with the geometries of all three buildings very quickly. For example, even before the outside building textures are rendered, a user can move around the buildings, or move closer or further away from a particular building.

After the geometries are fetched, it would be preferable to fetch the outside textures of the buildings 1, 2, and 3, before fetching any of the inside textures. This is so, because the inside textures are not visible to the user from the outside of the buildings. Finally, because a user must generally enter a building from the first floor, it would be preferable to fetch the textures for the first floors 406, 410, and 414, before fetching the textures for the second floors 407, 411, 415. The table 416 in FIG. 4, shows an ordered list of the assets that are prioritized according to the principles described above.

It is important to note that priority list 416 depends on the position of the camera. In this case, it is assumed that the camera is located outside of the three buildings. If a user moves the camera, the ordered list 416 may no longer be optimal. For example, if the user moves the camera inside of building 1 401, suddenly the first and second floor textures 406–407 of building 1 become more important than any of the remaining unfetched assets. Accordingly, as described below, the present invention prioritizes assets based on the position of the camera.

Figure 6:
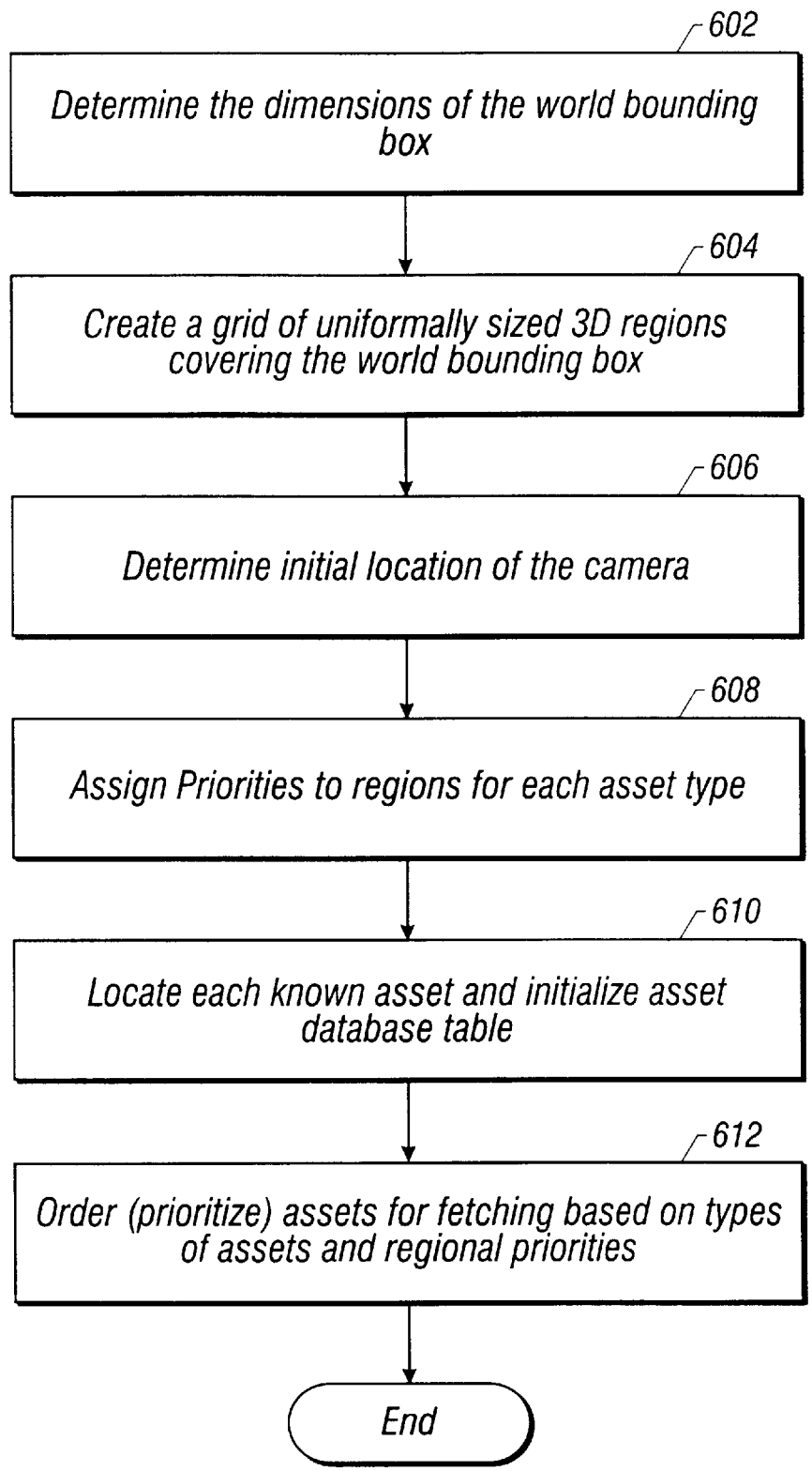
FIG. 6 and FIG. 8 are flowcharts depicting processes according to two embodiments of the present invention.

FIG. 6 is a flowchart depicting a process that can be used to implement the prioritizing techniques as described herein. The process begins with step 602. In step 602 the bounding box of the world is determined. The bounding box describes the size of the entire world in each dimension. Next, in step 604, a grid of 3D elements (referred to herein as "regions") is created. The union of all regions completely cover the world bounding box as determined in step 602. The grid created in step 604 will preferably only change if a new world is loaded or if the current world bounding box increased in any dimension.

Note that the grid constructed in step 604, is not actually "drawn" into the memory space representing the 3D world. Instead, the grid is represented internally, and is mathematically superimposed upon the 3D world. The internal representations of the grid is constructed using the same coordinate system as the 3D world. Hence, objects in the 3D world are easily mapped to the internal representations, and vice versa. Techniques using such internal representations to mathematically superimpose objects upon other objects are well known. Thus, after reading the instant disclosure, applying such techniques to an embodiment of the present invention will be apparent to those skilled in the relevant art.

If the regions are uniform in length, height and width, then the conditions under which the asset table database (described below) would require updating can be simplified. The size of the regions is determined by a heuristic algorithm which takes into account several factors including the size of the world and the size of the avatar. The avatar is a VRML 2.0 notion regarding the size of a viewer "in" the world that enables navigation paradigms to have an appropriate idea of scale. For purposes of this disclosure, the terms camera and avatar are synonymous. It should be noted that larger regions are advantageous because they allow for fewer asset database updates. On the other hand, smaller regions allow for finer-tuned prioritizations, as described below.

The position of the grid is aligned with a natural navigational surface, if one exists in the scene. For example, if a ground plane exists, the grid is aligned such that the natural navigational surface lies just inside one face of an array of grid elements. For example, a ground plane would be just inside the lower face of an array of grids in the X-Z plane. Once a grid is created as describe above, control passes to step 606.

In step 606, the process determines the initial location of the camera. In step 608 the process assigns priorities to the regions for each asset type, based on the position of the camera as determined in step 606. This process is described in detail below with references to FIGS. 5A–5D.

Next, in step 610, the process locates each known asset in the world (i.e., all that have been read-in with the first VRML file), and adds them to an asset database table. This includes providing bounding volumes for each asset so that the database can determine which regions contain at least some portion of the asset. It should be noted that some bounding regions will be the union of rectangular volumes while others will be the union of spherical volumes. In one embodiment of the present invention, unions are used to support instancing of asset data.

In step 612, assets are prioritized according to the asset type and the regional priorities assigned in step 608. The process of prioritizing regions and assets according to steps 608 and 612 above will now be described with reference to FIGS. 5A–5D (collectively, FIG. 5).

FIG. 5 represents a two dimensional example that is useful for describing the process for prioritizing assets according to the present invention. Note, the example presented is in two dimensions for the sake of simplicity. The concepts described herein can be easily extended to three dimensions, and such extensions will be apparent to those skilled in the relevant art(s). Further, it should be appreciated that the present invention is contemplated to apply to VRML scenes and similar graphical representations of simulated worlds comprising three dimensions. Accordingly, the examples used herein should not be construed to limit the scope and breadth of the present invention.

Figure 5A:
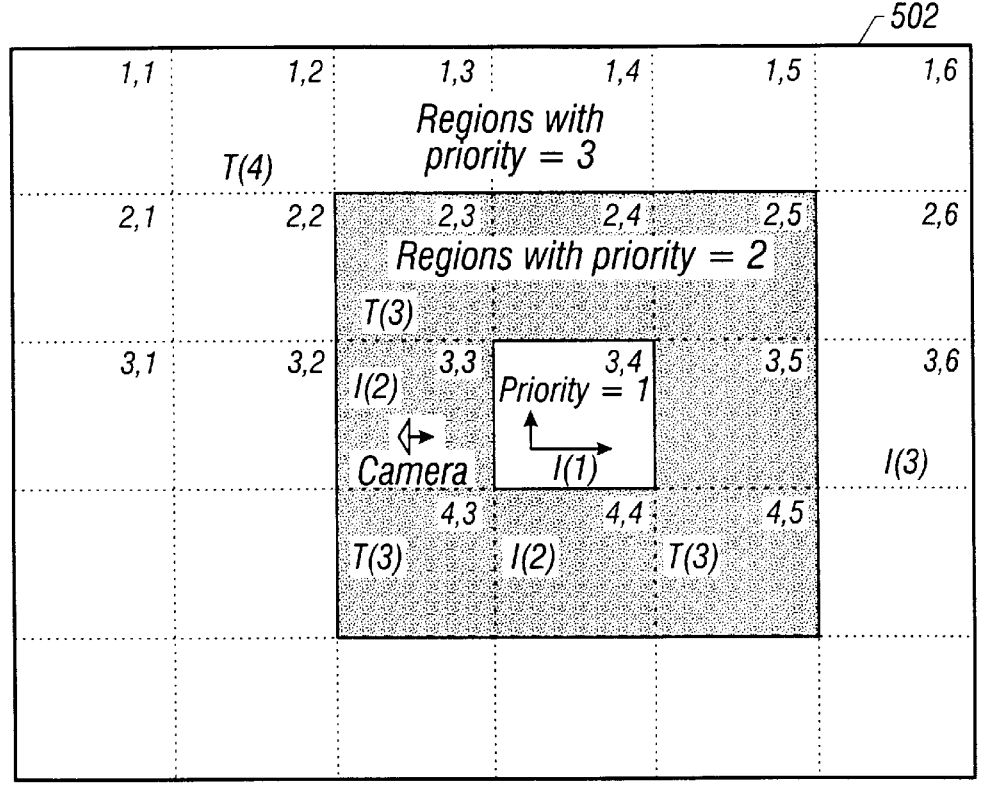
FIGS. 5A–5D represents a two dimensional example useful for describing the 3D process of prioritizing assets according to the present invention.

FIG. 5A depicts an example of a grid 502, such as the grid described above in step 604. Note, the grid 502 contains a plurality of regions. In this example, the regions are identified herein by referring to the row and column numbers. For example, the first region in the upper-left corner of the grid 502 is referred to as region 1,1. As stated above, each region, such as region 1,1, is assigned a particular priority for each type of asset. This is done in order to determine the fetching and caching priorities for each asset, as described below.

Figure 5B:
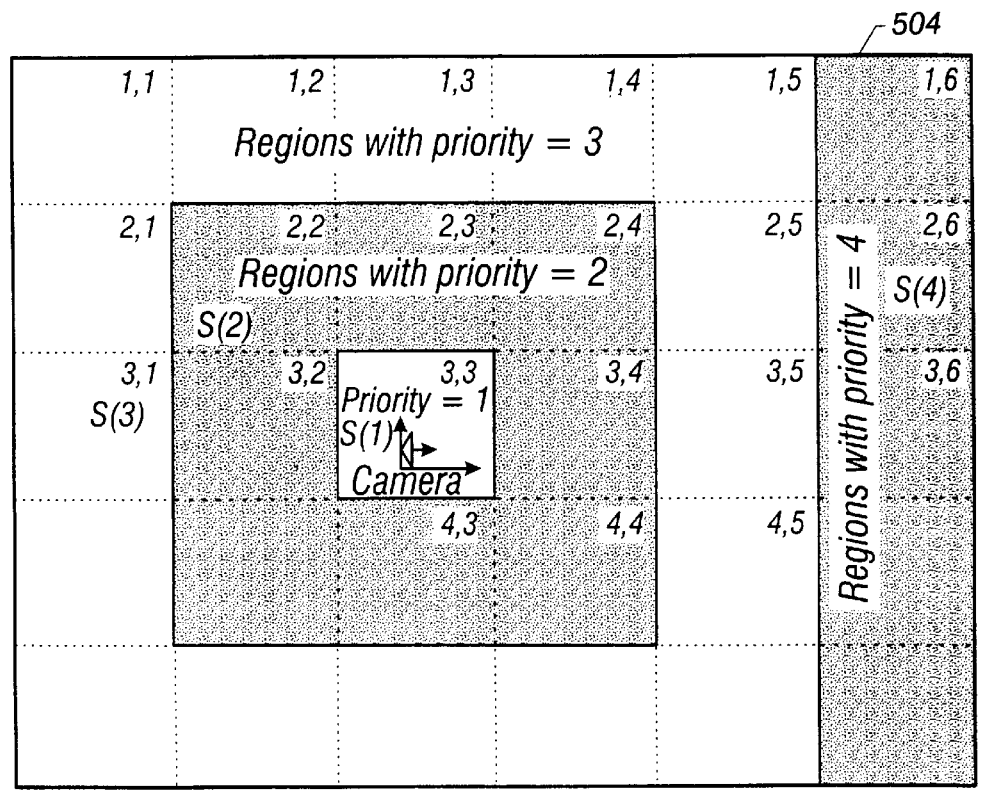
Figure 5C:
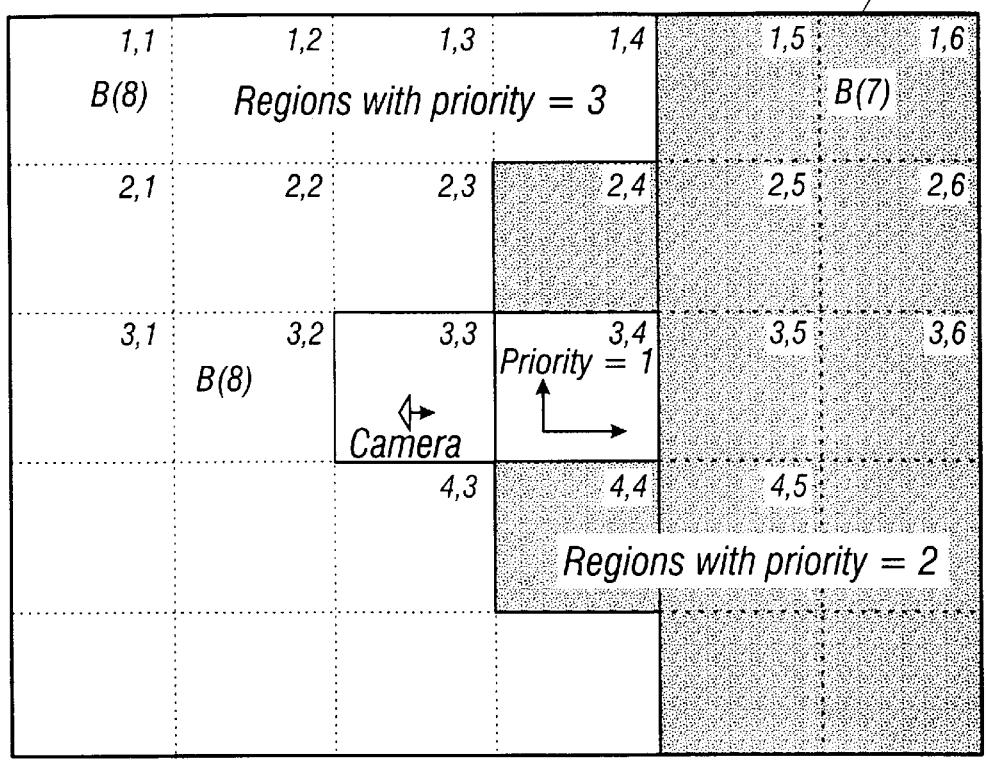

Region priorities differ with respect to different types of assets. FIG. 5A represents a grid showing the region priorities for texture and Inline assets. Similarly, FIG. 5B represents the same grid at the same instant in time, but shows the region priorities for audio assets. Likewise, FIG. 5C represents the same grid at the same instant in time, but shows the region priorities for behavior assets. In addition to displaying the regional priorities for particular asset types, the grids 502, 504, and 506 also show the location of particular assets and their calculated priorities, as described below.

Referring again to FIG. 5A, asset origins are defined for Inline and texture assets. In this example, it is assumed that the origins are coincident. Therefore, in this example, the coincident point is referred to as the asset origin. This asset origin is depicted by the intersection of two arrows in region 3,4. Generally, each asset origin is displaced a predetermined distance from the camera. In this case, the asset origin for Inline and texture assets is placed a predetermined distance from the camera, in the direction the camera is facing. As can be seen in FIG. 5A, the camera at this particular instant in time, is located in region 3,3, and is pointed toward region 3,4.

Whenever the camera moves, the asset origin moves with it. In a preferred embodiment, at any particular instant in time, the predetermined distance changes according to the speed of the camera. For example, if the camera is moving at a rapid speed the predetermined distance should increase. This causes more distant regions to have a higher priority when the camera is moving rapidly when camera is still. This principle reflects the fact that more distant objects are likely to become important when a camera is moving rapidly. Accordingly, camera position, orientation, speed and direction are factors that are taken into account when calculating region priorities. The choice of specific values that used in such calculations depends on the specific implementation of the present invention. However, such choices will be apparent to those skilled in the relevant art(s).

It should be noted that in one embodiment, the shape of the area corresponding to higher priority regions can change with the speed of the camera. For example, the box-shaped region depicted for the priority=2 regions shown in FIG. 5A, may be appropriate for a still or slow moving camera. However, for a rapidly moving camera, a bullet-shaped area extending from the camera, in the direction in which the camera is moving, may be more appropriate. A bullet-shaped area for a rapidly moving camera may better reflect the likely importance of particular regions in front of the moving camera. Important regions are those regions that are likely to become the focus of the user. For example, for a rapidly moving camera, it is likely that distant objects in a narrow field of view will become important. In contrast, it is more difficult to predict the next movement of a still camera. Thus, for still or slow moving camera, a box-shaped high priority region may be more appropriate.

The region priorities calculated for the slow moving camera depicted in FIG. 5A, will now be described. In general, the region containing an asset type origin is given the highest priority for that asset type. Accordingly, region 3,4 is shown with a priority=1. Generally, as the distance from the asset type origin increases, the region priorities decrease. Thus, as shown in FIG. 5A, the regions in the shaded area surrounding region 3,4, have a priority=2. All of the other non-shaded regions surrounding the priority=2 regions, have a priority=3.

After region priorities for a particular asset type have been calculated, assets of the corresponding types that appear in those regions are assigned priorities. The region priorities discussed above are used to determine the individual asset priorities. In order to accomplish this, each assets type is assigned a priority offset value. Generally, assets types that are considered important have lower offset values. Priority values for particular assets are determined by adding the asset priority offset value to the region priority which contains the asset. In the examples used herein, assume that the priority offset values are as follows:

TABLE 1

Offset values for assets

| Asset Type | Offset Value |
| --- | --- |
| Inline (I) | 0 |
| Texture (T) | 1 |
| Sound (S) | 0 |
| Behavior (B) | 4 |

Accordingly, in order to determine the priority for the Inline asset in region 3,4, the offset value of 0 is added to the priority assigned to region 3,4, namely 1. Thus, the priority for the Inline asset in region 3,4 is 0+1=1. This is depicted by the symbol "I(1)" shown in region 3,4. Note, in FIG. 5 the assets and their priorities are denoted by the first letter symbol of their asset type, as shown in table 1, followed by their calculated priority (in parenthesis), which is based on the offset value and the region priority, as described above.

Thus, in a similar fashion, priorities are assigned to the remaining assets shown in FIG. 5A. Specifically, the Inline assets in regions 3,3, 4,4 and 3,6 are assigned priorities 2,2, and 3, respectively. Likewise the texture assets in regions 2,3, 4,3 and 4,5 and 1,2 are assigned priorities 3,3, and 3, and 4, respectively.

FIG. 5B depicts the same grid at the same instant in time, as the grid shown in FIG. 5A. However, in the grid 504, the region priorities for audio assets (denoted as S, for sound)

are shown. Accordingly, an audio asset origin is placed in the grid 504. In this case, the asset origin resides at the same point as the camera, as shown in region 3,3. The audio asset origin is denoted by the intersection of the two arrows shown in region 3,3. Accordingly, region 3,3 has priority=1. The regions in the shaded area surrounding region 3,3 have priority=2. Similarly, the non-shaded regions surrounding the regions with priority=2, have priority=3. Further, the more distant regions in the shaded area on the right side of the grid 504, have priority=4.

Accordingly, in order to determine the priority for the sound asset in region 3,3, the offset value for sound assets, namely 0, is added to the priority assigned to region 3,3, namely 1. Thus, the priority for the sound asset in region 3,3 is 0+1=1. In a similar fashion, the remaining sound assets in FIG. 5B are assigned priorities. Specifically, the sound assets in regions 2,2, 3,1 and 2,6 are assigned priorities of 2,3, and 4, respectively.

FIG. 5C depicts the same grid at the same instant in time, as the grids shown in FIGS. 5A and 5B. However, the grid 506, depicts the region priorities for behavior assets. Accordingly, a behavior asset origin is placed in the grid 504. In this case, the asset origin resides at a predetermined distance from the camera. Hence, region 3,4 has priority=1. Further, the regions that are in the field of view of the camera (i.e. visible to the user), namely the shaded regions on the right side of the grid 506, have priority=2. Finally the remaining regions which are not in the current field of view of the camera, have priority=3.

Accordingly, using the same method as described above, the priority for the behavior asset in region 1,6 is the offset value of 5, plus the priority assigned to region 1,6, namely 2. Thus, the priority for the behavior asset in region 1,6 is 5+2=7. In a similar fashion, the remaining behavior assets in FIG. 5C are assigned priorities. Specifically, behavior assets in regions 1,1, and 3,2 are assigned priority values of 8.

Figure 5D:
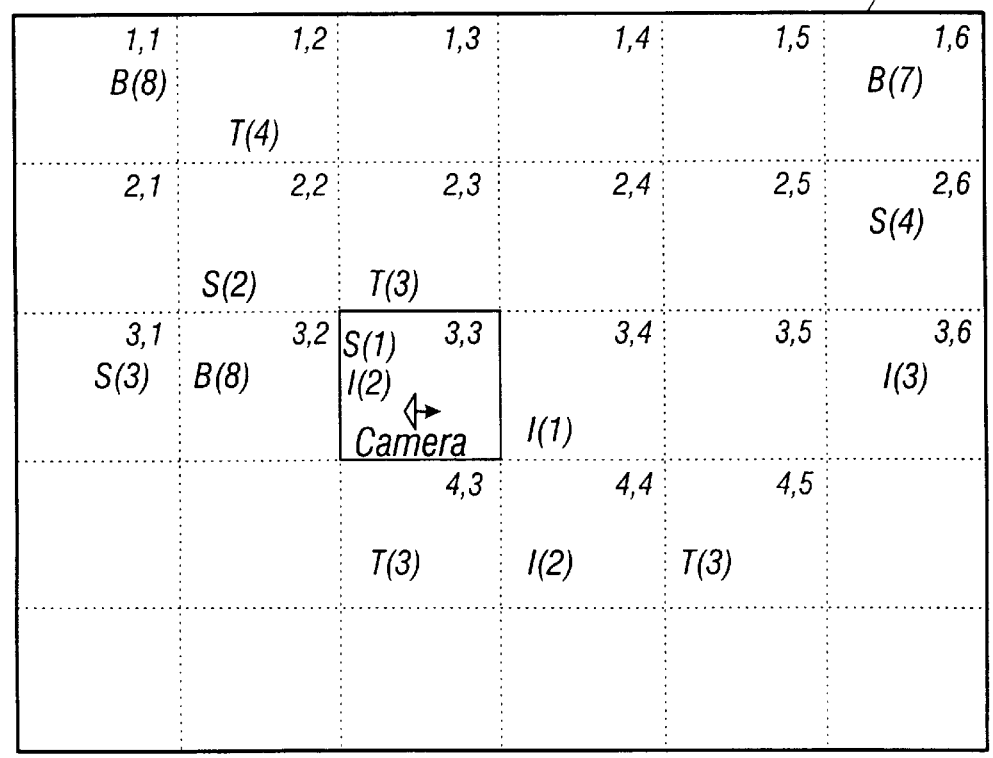

FIG. 5D shows all of the assets and their calculated priorities from FIGS. 5A–5C, superimposed on the grid 506. Thus, all of the assets in the world can now be ordered according to their priority. In one embodiment, the order is as follows: I(1), S(1), I(2), I(2), I(2), S(2), I(3), T(3), T(3), T(3), S(3), T(4), S(4), B(7), B(8) and B(8).

It should be noted that there are various methods that can be used to order assets of the same type that have the same priority. For example, note that there are three Inline assets with priority=2. Generally, these assets may be fetched in any order which is most convenient to the process. However, assets of different types that have the same priority are generally fetched according to the asset type. Accordingly, asset types are assigned a priority.

For example, in the examples presented herein, the asset types are prioritized in the following order: Inlines, textures, sounds, and behaviors. Accordingly, as shown above, the Inline asset having priority=2 is fetched before the sound asset having the priority=2. Likewise, the Inline assets having priority=3 are fetched before texture assets with priority=3, which is fetched before the sound asset with priority=3.

Also note that the regional priorities and, therefore, the asset priorities are transient. That is, the priorities can change over time. The regional and asset priorities shown in FIG. 5 only apply to a particular instant in time. Changes to priorities generally occur due to the camera changing regions or the asset changing regions (in the case of moving assets).

The operation of assigning priorities is driven by data in an asset database table. The asset database table is a database comprising information for each asset in the current scene. The information includes for example, the asset priority (as described above), the cache status, the regions in which the asset resides, the asset type, the geometrical bounds, the retrieval time, and the age of the asset.

For example, in one embodiment, the priority field contains the priority of each asset as described above. The cache status field contains the cache status. For example, the cache status field can contain values that describe the current location of the asset. For example, 0="performance buffer", 1="in memory", 2="disk", 3="being fetched", 4="not fetched", etc. In a preferred embodiment, the "being fetched" value can be overloaded by adding a fractional value to indicate a the fetch progress. For example, a value of 3.5 indicates that the asset is being fetched is 50% complete.

The regions field can be a list of regions where an asset is located. The asset type field can contain the type of asset, such as Inline, sound or texture, as described above. The bounds field can contain a measure of the size of the asset. For example, for sound assets a maximum audible range is an appropriate value for the bounds field. Similarly, for Inline assets, a bounding box would be appropriate. The retrieval time contains a multi-valued field indicating the time to load from disk and from a network. This field is used for cache management purposes, as described below.

It should be appreciated that the process for assigning and updating priorities should be kept as lightweight as possible in order to benefit from the increased perception of performance provided by an embodiment of the present invention. That is, the decrease in performance due to the additional process of assigning and updating priorities, should not outweigh the increase in performance provided by the present invention. In one embodiment, asset priorities are updated whenever the camera crosses a region boundary. However in a preferred embodiment, asset priorities for particular asset types are updated whenever the associated asset type origin crosses a region boundary. Thus, in a preferred embodiment, each asset type origin is tracked so that a notification is sent whenever it crosses a region boundary. When this occurs, the region priorities are updated with new values and the asset priorities for that asset type are updated accordingly.

Note that it may be inefficient to sort the asset priorities whenever an asset type origin changes regions, or one or more new assets are added to the database. Accordingly, to avoid sorting asset priorities, the asset database table preferably supports an interface which returns the next asset to be fetched. This method can be implemented efficiently since only the highest priority item is needed at any one time, as described below. Further, regional priorities can be searched quickly, and only assets within a small set of regions need to be checked for their current state to determine whether or not they have been fetched.

In a preferred embodiment, asset fetching is performed in an execution thread that is separate from the browser's runtime thread. The fetching process thread is not CPU intensive and will often be in a wait state. The fetching thread preferably supports a configurable queue of fetch elements comprising a number of "active" fetches. Generally, multiple assets can be fetched at the same time. These assets are referred to herein as active fetches. The remaining fetch element(s) are referred to herein as "waiting" fetches. For the purposes of this example, assume the number of active fetches is 4 and the number of waiting fetches is 1. The number of active fetches and waiting fetches used in a specific implementation of the present invention depends on various hardware and software parameters, and will be apparent to those skilled in the relevant art(s).

Accordingly, the expected state of the fetcher will be 4 active fetch requests and 1 waiting fetch request. Further, the fetch queue comprises fetch requests for assets that have the current highest priority according to the principles described above. Thus, the queue is maintained as described above by setting up 4 active and one waiting initial requests. Whenever an active request is completed, the waiting request becomes active. The process then loads into the waiting queue element a fetch request for an unfetched asset having the highest priority. A process that can be used to implement the fetching queues will now be described with reference to FIG. 8. In this example, it is again assumed that the active queue contains 4 elements and the waiting queue contains 1 element. However, as stated, various queue sizes can be used in different embodiments of the present invention.

The process begins with step 802 where the first 5 high priority assets are identified, according the principles described above. Note that the information needed to fetch the assets, such as the URLs etc., are found in the asset database table, as described above. The fetch requests for the first 4 high priority assets are loaded into the active queue, and the fetch request for the asset having the fifth highest priority is loaded into the waiting queue. Control passes to step 804. In step 804, the process begins fetching the assets associated with the 4 active fetch requests. Next, in step 806, the process determines whether any active fetches have been complete. As stated above, this process is not CPU intensive and much of the time is spent in a waiting state as depicted by the loop in step 806.

Once an active fetch has completed, the process continues with step 808. In step 808, the process moves the element from the waiting queue to the active queue and begins fetching that asset. Control then passes to step 810. In step 810, the process goes to the asset table database and identifies the next asset with the highest priority. The waiting queue is then updated with a new fetch request associated with that asset. Next as step 812 indicates, the process ends if there are no assets remaining in the 3D world that need to be fetched. If more assets remain, control passes back to step 806 where steps 806–812 are repeated and all remaining assets are fetched.

It should be noted that when an active fetch has been completed, the fetching thread may perform several additional steps to deal with the results of the completed fetch. For example, in the case of Inline nodes, additional assets may be added to the asset database table.

Figure 8:
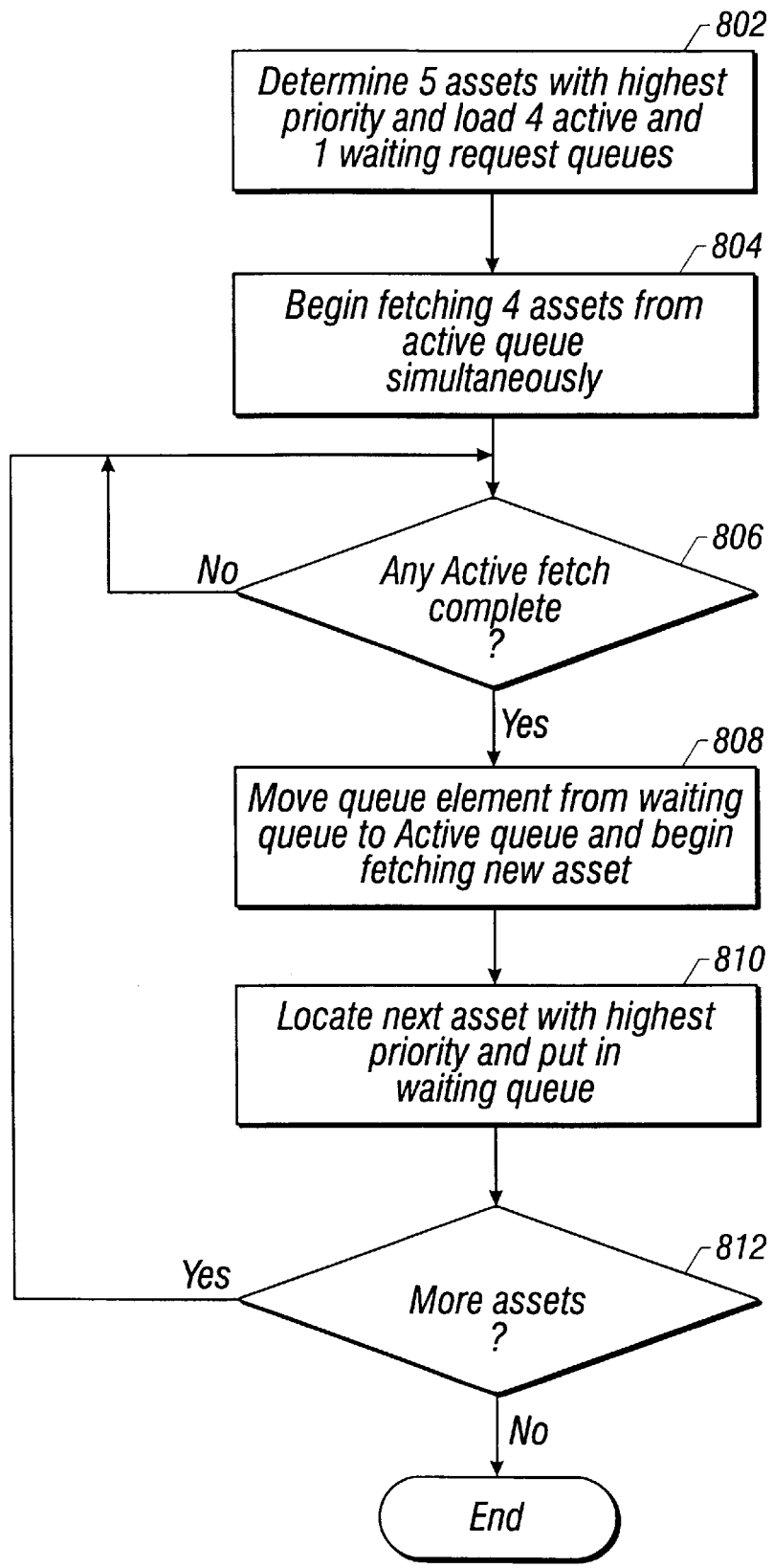

The process described with reference to FIG. 8 is most efficient for large worlds because at any given time, only the top 5 assets need to be determined. These assets are found by starting at the type asset origin regions and moving outward until 5 requests have been made. The search state can be maintained between asset priority requests, and restarted whenever necessary, such as whenever an asset type origin changes regions.

In addition, note that only the highest priority assets should remain in the request queues at all times. This can be accomplished by ensuring that this state initially exists and continues to exist in the case when: (1) an asset type origin has crossed a region boundary, (2) new assets are added to the asset database, or (3) an asset crosses a region boundary.

In all three cases above, a message is generally sent to the fetching process to indicate that asset priorities may have changed. When this occurs, the fetch process requests the next asset to be fetched from the asset database table. The process then compares the priority of the new asset to the asset associated with the asset in the wait queue. If the new asset has a priority equal to or less than the waiting asset's priority, then the process then returns to the waiting state (step 806 above). In the case of the new asset having a higher priority, the waiting fetch request is aborted and the new asset is requested.

This process can be continued as described above, where fetches in the active queue can be aborted while higher priority assets need to be fetched. However, in a preferred embodiment, heuristics are used to avoid aborting fetches that are near completion.

In a preferred embodiment, the prioritizing and techniques as described above are also used for cache management of URLs. In a preferred embodiment, a four level cache model is used. However, in alternate embodiments, a different number of levels can be used to implement the cache management techniques as described herein. As such, the use of a four level cache is used of exemplary purposes only and should not be used to limit the scope and breadth of the present invention.

For example, a four level cache can consist of: (1) a performance buffer, (2) memory, such as random access memory, (3) disk storage and (4) the world wide web (WWW). Performance buffers are memory locations within specific hardware devices, such as texture memory within a video card, or sound memory within a sound card. Note, in this example, an asset having a cache level of 4 is the same as an asset having a status of 'not fetched', as described above.

Accordingly, the prioritizing techniques as described herein can be used to prioritize assets for cache management. That is, asset priorities are used to decide what level of cache is appropriate for assets. For example, in one embodiment, it may be appropriate to assign a cache level of at least 2 for all assets having a priority of 1–3. Similarly, it may be appropriate to assign a cache level of at least 3 for all assets having a priority of 4–6. In this example, all assets having a priority of 7 and above will not be fetched from the network until space is available in the cache levels 1–3.

In addition, the priorities as described above, can be used to remove assets from cache that no longer have a high priority in order to make room for assets that have a higher priority. For example, if memory is full (cache level 2), the priority scheme can be used to decide which, if any, assets can be removed from memory to be either discarded or transferred to disk (cache level 3). Similarly, if the allocated space for disk cache is full, the priority scheme can be used to decide which, if any, assets should be discarded. Note that many techniques can be use to implement a cache management system using the principles described herein and such techniques will be apparent to persons skilled in the relevant art(s).

Figure 7:
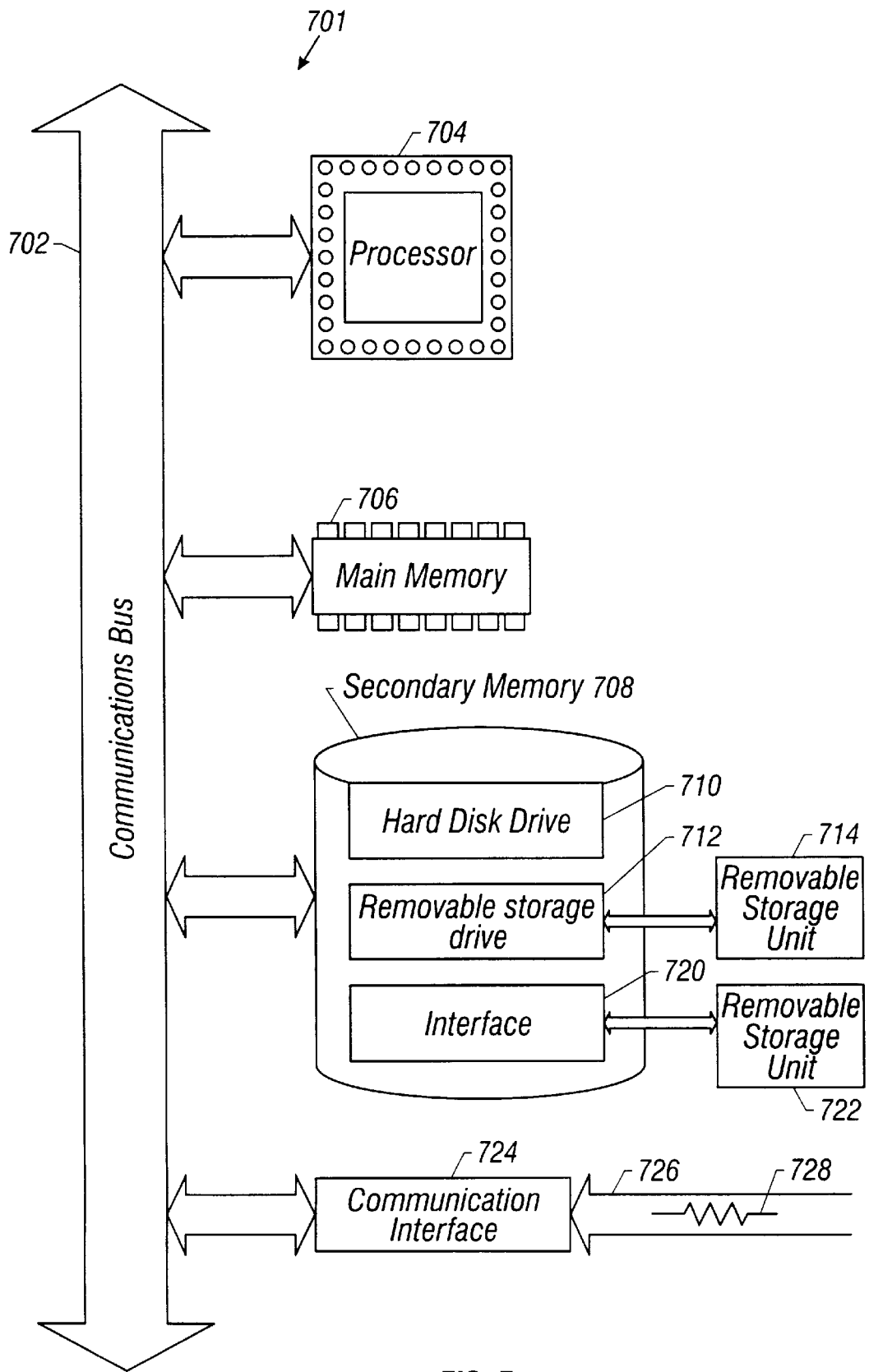
FIG. 7 is a block diagram of a computer system that can be used to implement the present invention.

The present invention may be implemented using hardware, software or a combination thereof and may be implemented in a computer system or other processing system. In fact, in one embodiment, the invention is directed toward a computer system capable of carrying out the functionality described herein. An example computer system 701 is shown in FIG. 7. The computer system 701 includes one or more processors, such as processor 704. The processor 704 is connected to a communication bus 702. Various software embodiments are described in terms of this example computer system. After reading this description, it will become apparent to a person skilled in the relevant art how to implement the invention using other computer systems and/or computer architectures.

Computer system 702 also includes a main memory 706, preferably random access memory (RAM), and can also include a secondary memory 708. The secondary memory 708 can include, for example, a hard disk drive 710 and/or a removable storage drive 712, representing a floppy disk drive, a magnetic tape drive, an optical disk drive, etc. The removable storage drive 712 reads from and/or writes to a removable storage unit 714 in a well known manner. Removable storage unit 714, represents a floppy disk, magnetic tape, optical disk, etc. which is read by and written to by removable storage drive 712. As will be appreciated, the removable storage unit 714 includes a computer usable storage medium having stored therein computer software and/or data.

In alternative embodiments, secondary memory 708 may include other similar means for allowing computer programs or other instructions to be loaded into computer system 701. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 701.

Computer system 701 can also include a communications interface 724. Communications interface 724 allows software and data to be transferred between computer system 701 and external devices. Examples of communications interface 724 can include a modem, a network interface (such as an Ethernet card), a communications port, a PCM-CIA slot and card, etc. Software and data transferred via communications interface 724 are in the form of signals which can be electronic, electromagnetic, optical or other signals capable of being received by communications interface 724. These signals 726 are provided to communications interface via a channel 728. This channel 728 carries signals 726 and can be implemented using wire or cable, fiber optics, a phone line, a cellular phone link, an RF link and other communications channels.

In this document, the terms "computer program medium" and "computer usable medium" are used to generally refer to media such as removable storage device 712, a hard disk installed in hard disk drive 710, and signals 726. These computer program products are means for providing software to computer system 701.

Computer programs (also called computer control logic) are stored in main memory and/or secondary memory 708. Computer programs can also be received via communications interface 724. Such computer programs, when executed, enable the computer system 701 to perform the features of the present invention as discussed herein. In particular, the computer programs, when executed, enable the processor 704 to perform the features of the present invention. Accordingly, such computer programs represent controllers of the computer system 701.

In an embodiment where the invention is implemented using software, the software may be stored in a computer program product and loaded into computer system 701 using removable storage drive 712, hard drive 710 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A process for increasing the performance associated with creating an interactive three dimensional (3D) world that is modeled using assets each having an asset type, said 3D world capable of being viewed on a computer display from the viewpoint of a virtual camera having a selectable velocity and position, said process comprising the steps of:

determining a world bounding box for the world;

creating a grid enclosing said world bounding box, said grid comprising a plurality of regions;

defining region priorities to said regions; and assigning asset priorities for said assets based on the asset types and said region priorities.

2. The process of claim 1, further comprising the step of: ordering said assets based on said asset priority.

3. The process of claim 2, further comprising the step of: fetching said assets based on said ordering step.

4. The process of claim 1, further comprising the step of:

updating an asset database table with information related to said assets.

5. The process of claim 1, wherein said 3D world is modeled using Virtual Reality Modeling Language.

6. The process of claim 1, wherein said defining step comprises the steps of:

finding the position of the virtual camera; and defining a region priority for each said region using predetermined criteria based on said position the virtual camera.

7. The process of claim 6, wherein said predetermined criteria is additionally based on the velocity of the virtual camera.

8. The process of claim 1, wherein said defining step comprises the steps of:

finding the position of the virtual camera; and constructing an asset origin within said grid for each asset type, said asset origin being displaced a fixed distance from said position of the virtual camera; and defining a region priority for each said region using predetermined criteria based on the distance of said region from said asset origin.

9. The process of claim 8, wherein said predetermined criteria is additionally based on the velocity of said asset origin.

10. The process of claim 8, further comprising the steps of:
    assigning an offset value for each asset type; and
    assigning an asset priority to each asset based on said region priority and said offset value.

11. The process of claim 3, wherein said ordering and fetching steps comprise the steps of:
    constructing a fetch request queue comprising N elements;
    loading said fetch request queue with N fetch requests for the first N assets having the highest said asset priority;
    fetching said assets based on said fetch request queue;
    loading said fetch request queue with another fetch request upon completion of a fetch request.

12. The process of claim 3, wherein said ordering and fetching steps comprise the steps of:
    constructing an active queue comprising N elements;
    constructing a waiting queue comprising M elements;
    loading said active queue with N fetch requests for the first N assets having the highest said asset priority;
    loading said waiting queue with M fetch requests for the next M assets having the highest said asset priority;
    loading said active queue with a fetch request from said waiting queue when said fetch request from said active queue is complete; and
    loading said waiting queue with a fetch request for the next asset having the highest said asset priority.

13. The process of claim 1, further comprising the step of:
    performing cache management for said assets based on said asset priority.

14. The process of claim 13, wherein said performing step comprises the steps of:
    defining N levels of cache storage;
    determining whether to store or remove assets from a particular said level by comparing said asset priorities.

15. A computer program-product readable by a computer system, tangibly embodying a computer program-product comprising instructions executable by the computer system to perform method steps for increasing the performance associated with creating an interactive three dimensional (3D) world that is modeled using assets each having an asset type, said 3D world capable of being viewed on a computer display from the viewpoint of a virtual camera having a selectable velocity and position, said method steps comprising the steps of:
    determining a world bounding box for the world;
    creating a grid enclosing said world bounding box, said grid comprising a plurality of regions;
    defining region priorities to said regions; and
    assigning asset priorities for said assets based on the asset types and said region priorities.

16. The computer program-product of claim 15, further comprising the step of:
    ordering said assets based on said asset priority.

17. The computer program-product of claim 16, further comprising the step of:
    fetching said assets based on said ordering step.

18. The computer program-product of claim 15, further comprising the step of:
    updating an asset database table with information related to each said asset.

19. The computer program-product of claim 15, wherein said 3D world is modeled using Virtual Reality Modeling Language.

20. The computer program-product of claim 15, wherein said defining step comprises the steps of:
    finding the position of the virtual camera; and
    defining a region priority for each said region using predetermined criteria based on the position the virtual camera.

21. The computer program-product of claim 20, wherein said predetermined criteria is additionally based on the velocity of the virtual camera.

22. The computer program-product of claim 15, wherein said defining step comprises the steps of:
    finding the position of the virtual camera; and
    constructing an asset origin within said grid for each asset type, said asset origin being displaced a fixed distance from the virtual camera; and
    defining a region priority for each said region using predetermined criteria based on the distance of said region from said asset origin.

23. The computer program-product of claim 22, wherein said predetermined criteria is additionally based on the velocity of said asset origin.

24. The computer program-product of claim 22, further comprising the steps of:
    assigning an offset value for each asset type; and
    assigning an asset priority to each asset based on said region priority and said offset value.

25. The computer program-product of claim 17, wherein said ordering and fetching steps comprise the steps of:
    constructing a fetch request queue comprising N elements;
    loading said fetch request queue with N fetch requests for the first N assets having the highest said asset priority;
    fetching said assets based on said fetch request queue;
    loading said fetch request queue with another fetch request upon completion of a fetch request.

26. The computer program-product of claim 17, wherein said ordering and fetching steps comprise the steps of:
    constructing an active queue comprising N elements;
    constructing a waiting queue comprising M elements;
    loading said active queue with N fetch requests for the first N assets having the highest said asset priority;
    loading said waiting queue with M fetch requests for the next M assets having the highest said asset priority;
    loading said active queue with a fetch request from said waiting queue when said fetch request from said active queue is complete; and
    loading said waiting queue with a fetch request for the next asset having the highest said asset priority.

27. The computer program-product of claim 15, further comprising the step of:
    performing cache management for said assets based on said asset priority.

28. The computer program-product of claim 27, wherein said performing step comprises the steps of:
    defining N levels of cache storage;
    determining whether to store or remove assets from a particular said level by comparing said asset priorities.

29. A system for increasing the performance associated with creating an interactive three dimensional (3D) world that is modeled using assets each having an asset types, said 3D world is viewed on a computer display from the viewpoint of a virtual camera, said system comprising:
    means for determining the world bounding box of the world;

grid creating means for creating a grid that encloses said world bounding box, said grid comprising a plurality of regions;

region prioritizing means for assigning region priorities to said regions; and asset prioritizing means for assigning asset priorities to each of said assets, based on the asset types and said region priorities.

30. The system according to claim 29, further comprising:

ordering means for ordering said assets based on said asset prioritizing means.

31. The system according to claim 29, further comprising:

asset table means for updating an asset database table with information related to said assets.

32. The system of claim 30, further comprising fetching means for fetching said assets based on said ordering means.

33. The system of claim 30, further comprising cache management means for performing cache management for assets based on said ordering means.

* * * * *